United States Patent
Santana

[11] Patent Number: 6,109,295
[45] Date of Patent: Aug. 29, 2000

[54] HIGH RELIABILITY AND EFFICIENCY VALVE WITH LARGE FLOW CAPACITY

[76] Inventor: Elisseo Santana, Rua Racine 752, Sao Paulo SP 05086-000, Brazil

[21] Appl. No.: 09/388,118

[22] Filed: Sep. 1, 1999

[51] Int. Cl.[7] .......................... F16K 31/24; F16K 33/00; F16K 1/42; F16K 1/14
[52] U.S. Cl. .................. 137/449; 137/442; 137/516.29; 137/549; 141/198; 251/363; 251/900
[58] Field of Search .................. 137/434, 442, 137/443, 444, 449, 516.29, 549; 141/198; 251/359, 360, 363, 364, 900; 119/80; 73/305, 317, 322.5; 222/67

[56] References Cited

U.S. PATENT DOCUMENTS

| | | | |
|---|---|---|---|
| 766,416 | 8/1904 | Booth | 137/449 |
| 1,044,311 | 11/1912 | Wall | 137/449 |
| 1,097,476 | 5/1914 | Scott | 137/447 |
| 1,551,808 | 9/1925 | Dixon | 137/449 |
| 1,619,431 | 3/1927 | Mendizabal | 137/449 |
| 1,623,374 | 4/1927 | Anderson | 137/449 |
| 1,883,480 | 10/1932 | Bauer | 137/444 |
| 2,246,388 | 6/1941 | Sica | 137/442 |
| 2,682,888 | 7/1954 | Crockett | 137/449 |
| 2,724,404 | 11/1955 | Kass | 137/449 |
| 2,730,122 | 1/1956 | Svirsky | 137/442 |
| 2,959,188 | 11/1960 | Kepner | 251/363 |
| 3,024,799 | 3/1962 | Flieder | 137/449 |
| 3,091,254 | 5/1963 | Kilayko | 137/516.29 |
| 3,269,406 | 8/1966 | Grose | 137/436 |
| 3,384,109 | 5/1968 | Strouburg et al. | 137/444 |
| 3,548,869 | 12/1970 | Weise et al. | 137/516.29 |
| 3,620,653 | 11/1971 | Gaylord et al. | 137/516.29 |
| 4,461,453 | 7/1984 | Wilson | 251/251 |
| 4,462,417 | 7/1984 | Trinkwalter | 137/449 |
| 4,474,208 | 10/1984 | Looney | 137/516.29 |
| 4,513,778 | 4/1985 | Vadasz | 137/533.11 |
| 4,781,213 | 11/1988 | Kilayko | 137/516.29 |
| 4,873,832 | 10/1989 | Porter | 137/449 |
| 4,901,754 | 2/1990 | Sable et al. | 137/433 |
| 5,288,053 | 2/1994 | Young | 251/98 |
| 5,645,105 | 7/1997 | Gravson | 137/449 |

FOREIGN PATENT DOCUMENTS

7602045 U of 0000 Brazil .

*Primary Examiner*—George L. Walton
*Attorney, Agent, or Firm*—Thomas E Workman, Jr.

[57] ABSTRACT

This invention relates to an improved valve which achieves high reliability through a simplicity of design, a minimum number of parts, a unique valve seat with a two stage sealing action, and at the same time provides a large flow when in the open position, owing to a large cross section opening. The valve features an improved sealing efficiency, in that when in the closed position an increase in pressure on the valve improves the performance of the valve, rather than increasing the likelihood of a leak. The valve is designed to be used in applications which permit the flow of material beyond the valve mechanism to discharge freely, whereby the discharged material activates a float mechanism so as to permit the valve to close when the discharged material reaches a preset level.

4 Claims, 14 Drawing Sheets

HIGH RELIABILITY AND EFFICIENCY VALVE WITH LARGE FLOW CAPACITY

BACKGROUND OF THE INVENTION

1. Field of the Invention

The requirement to refill containers to a prescribed level occurs frequently, and calls out for a valve that is low cost, highly reliable, efficient in both preventing flow when no flow is indicated, and permitting a large flow when flow is desired. By virtue of their many parts, valves often fail because vibrations cause the parts to come apart, or because friction between the moving parts causes wear and ultimately a failure in the valve's capability to prevent flow in the "off" position. In addition, valves which are designed to remain sealed, with the exception of a single exit orifice, require a seal of some type in order to interface the operating knob or lever to the valve, creating an opportunity for leaks or requiring maintenance when leaks develop. In addition, valves that use a sphere which mates with a concave surface of the same radius often develop leaks due to small contaminants which may become trapped between the sphere and the seat, thereby scratching either the sphere or the seat, and producing a leak in the valve's sealing mechanism. The invention solves these problems by virtue of a simple one part housing that is inexpensive to manufacture and highly reliable, no seals to interface the operating lever to the valve, a highly efficient two stage mechanism when the valve is in the off position, and a high flow performance when the valve is in the open position. Such valves are often referred to as "filling" valves, or "float" valves.

2. Description of Prior Art

The subject invention solves the problem of creating a valve that is not susceptible to leaks, even when used with water supplies that have impurities. Previous inventions taught some, but not all, of the features of this invention.

U.S. Pat. No. 4,462,417 for a valve assembly presented a solution to the problem of using a sphere mating with a cylindrical seat, in the application of a propane or LPG application, in which the material passing through the valve is a gas, and does not contain impurities. If impurities were to pass through this valve, as the valve were closing, they would become trapped between the sphere and the cylindrical seat, creating an indentation in either the sphere or the cylinder if the material had a hardness sufficient to create such an indentation, and would thereby create a leak in the sealing mechanism.

U.S. Pat. No. 4,873,832 for a liquid level control for a cryogenic fluid utilized a sphere which, when in the sealing position to prevent flow, formed a seal by making contact with a circular opening having a diameter smaller than that of the sphere, when the actuating lever permits the sphere to completely contact the bore through which fluid passes in the valve's open state. The valve operates with ultra pure fluids, in a semiconductor manufacturing environment, and would not operate effectively in the presence of any contaminants, which would become lodged in the valve seat mechanism, creating a leak and destroying the ability of the valve to maintain the desired level of fluid.

U.S. Pat. No. 3,269,406 is a valve that is intended to operate with water, or other fluids that might contain contaminants. Due to the design, which places pressure on the sphere from below, through force generated by a float exerted through a lever, the valve will inadvertently permit flow whenever the inlet pressure exceeds the force generated by the float, leveraged through a rod or pawl intended to press the sphere firmly into a funnel like seat. The design will leak whenever a contaminant, for example a grain of sand, lodges between the sphere and the funnel shaped valve seat.

U.S. Pat. No. 1,619,431 is a valve that utilizes a rubber O-Ring in conjunction with a metal seat. This valve operates in a vertical, rather than a horizontal position, and as a result contaminants like sand will tend to collect on the O-Ring at the lowest position, thereby wearing at the O-Ring in the same place, and thereby reducing the reliability of the valve. As disclosed, this invention provides for the sphere to make contact with a seat on both sides of the O-Ring, thereby permitting a contaminant to be trapped between two hard surfaces. If the contaminant is trapped between the sphere and the hard seat of the valve, the valve will fail to inhibit the flow of a fluid when in the "off" position. This invention also requires a positive pressure from the inlet in order to seal, and under very low pressures or intermittent negative pressures will leak.

U.S. Pat. No. 5,645,105 is for a tank filling shut-off valve in which a sphere makes contact with an O-Ring when the entire valve assembly rises to a point that removes an affixed rod from blocking the sphere's ability to fall into place and form a seal with the O-Ring. The design depends on the weight of the valve assembly to be sufficient to overcome the pressure that the inlet fluid exerts on the sphere. In the event that the inlet pressure is high, the valve may fail to open until the pressure drops low enough to permit the rod to force the sphere upward, thereby permitting a flow of fluid through the valve.

U.S. Pat. No. 766,416 is for a valve that serves a hog waterer, and employs a cylindrical seat of a material that conforms with the sphere pressed against it by gravity supplemented by the force of a second sphere, whose purpose is to provide an additional pressure on the lower sphere, and to thereby improve the seal. Under high pressure, this design is susceptible to leaks around the sealing mechanism, which depends on the deforming material holding shape against high pressures.

U.S. Pat. No. 1,623,374 is for a valve having a sphere that rests in a concave seat containing a hole through which water is discharged. The valve depends on a metal to metal contact for a seal, and depends on gravity to force the sphere against the pressure of water flowing below the sphere. Under very high flow situations, the valve may fail to close, due to the high flow tending to press the sphere into the housing provided to hold the sphere when the valve is in the open position.

U.S. Pat. No. 1,097,476 is for a valve which operates with a deformable seal, and under high pressures would leak. In the vertical rendition, a very high pressure and resulting flow could force the sphere to remain in the open position, since the flow does not reinforce the sphere's being forced to seal the valve closed. In this instance, the valve could fail to close when the water level reached the desired level, thereby causing an overflow and a failure of the system controlled by the valve.

U.S. Pat. No. 1,551,808 is for a valve made of an inverted "U" shaped housing, with a plug threaded from the top, and a sphere made of rubber or some other compressible material. Under very high pressures, a compressible sphere could be forced through the outlet opening, causing the valve to fail. A compressible sphere would also degrade with time, necessitating a repair or replacement of the valve. Such a repair is contemplated by the threaded plug in the invention.

The prior art does not solve the problem of providing a valve that is secure in the closed position under both zero and high pressure, tolerant of impurities, simple to manufacture, and with an ease of configuration and installation.

SUMMARY OF THE INVENTION

This High Reliability and Efficiency Valve with Large Flow Capacity is designed to be efficient in an off position by virtue of a unique seat mechanism that may be molded into the cylindrical housing, and which contains an O ring which creates a seal when the pressure is zero to moderate. The O ring compresses under high pressure, permitting the sphere to make contact with a machined seat, forming a tight seal under high pressure. The two mechanisms for sealing flow create a valve that closes tight under zero pressure, owing to the force of gravity creating a seal between the sphere and the O ring, and under great pressures, owing to the tight seal between the base and sphere.

By virtue of a two stage seal, the valve has the added benefit of tolerating impurities and protecting the metallic machined parts of the valve. Common impurities, such as sand or small granules of metallic materials, either flow through the valve or are trapped first by the sphere making contact with the O-Ring. As pressure increases, the contaminant seals between the O-Ring and the sphere, thereby protecting the metal on metal seal created under high pressure. A screen filter is included within the valve to serve the dual purpose of preventing large impurities from entering the valve mechanism, and preventing the sphere from being pulled back into the plumbing, under an unexpected negative pressure in the fluid feeding the valve.

The valve is attached to the source of incoming liquid by means of a threaded end, which may be attached using traditional plumbing tape or compounds used to create a long term seal. The mechanism for turning flow on or off is located in the portion of the housing that is in the portion of the housing that is not pressurized, and is thus not susceptible to leaks. The lack of seals, and the simplicity of the lever mechanism, creates a highly reliable on/off mechanism for operating the valve. The float attached to the lever arm must be made of a material with a lower specific density than the liquid flowing through the valve, and the float must be positioned and sized so that the moment of force on the lever at the point where the lever contacts the sphere is greater than the moment formed by the mass of the valve, when the float is removed from the liquid in which it normally floats.

DESCRIPTION OF THE PREFERRED EMBODIMENT

Figure 1:
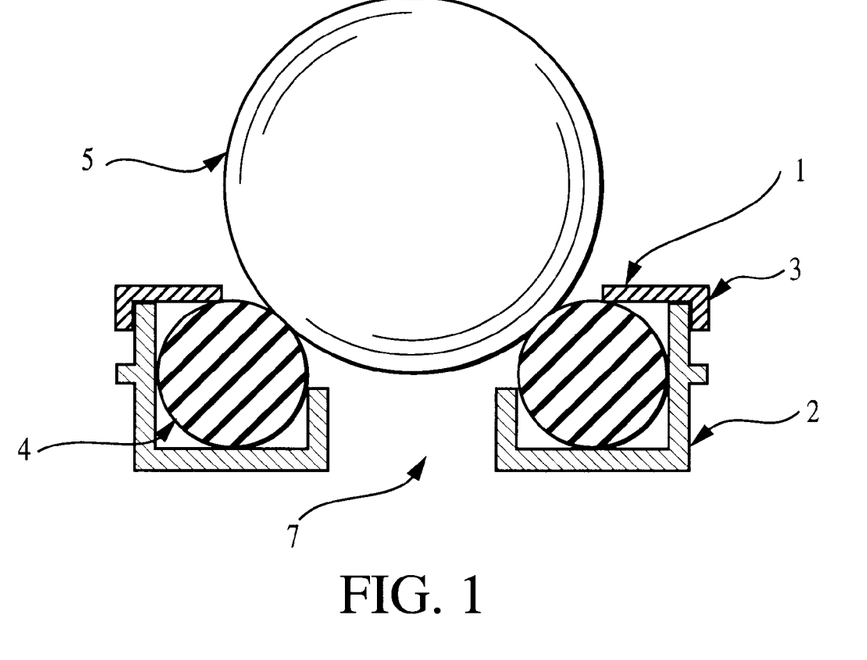
FIG. 1 shows a cross section of the seat of the valve in a closed position, under zero or minimal pressure.

In the preferred embodiment as shown in FIG. 1, a cross section of the seat 1 of the valve is shown in a closed position, under no pressure or a very light pressure. The seat consists of a lower base part 2 which mates with an upper base part 3 so as to contain an O ring 4. The sphere 5 creates a seal with the O ring 4 by means of gravity plus any pressure exerted by the liquid being managed by the valve. The lower base part has a circular opening 7 which has a diameter that is smaller than the diameter of the sphere.

Figure 2:
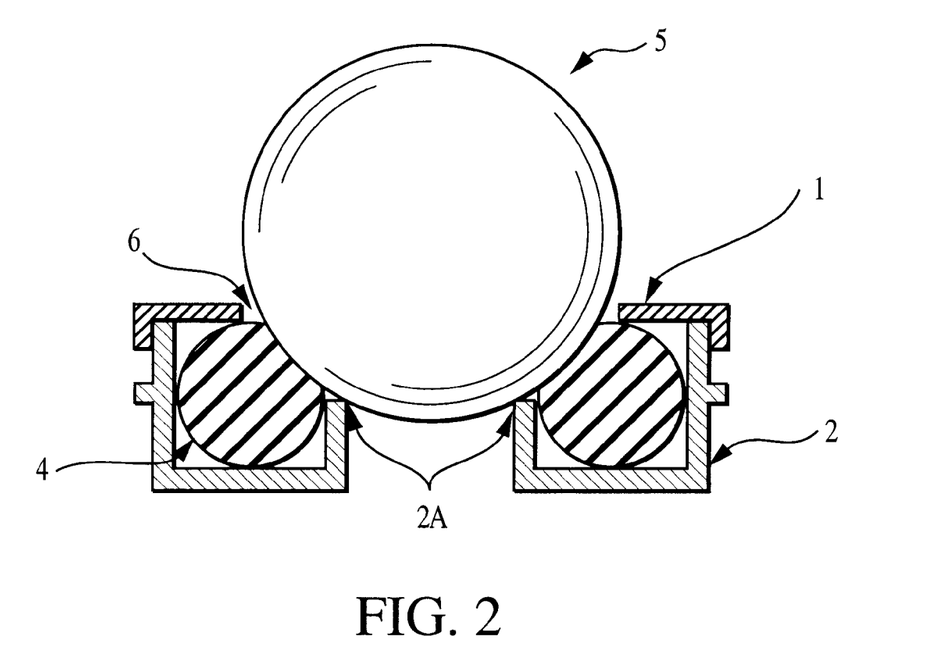
FIG. 2 shows a cross section of the seat of the valve in a closed position, under high pressure.

In the preferred embodiment as shown in FIG. 2, a cross section of the seat 1 of the valve is shown in a closed position, under high pressure. The upper base part has a circular opening 6 which has a diameter that is larger than the diameter of the sphere 5. The sphere 5 creates a seal with the O ring 4 and by contacting the circular opening in the lower base part 2. As pressure in the valve increases, the sphere 5 makes contact with the lower base part 2 at a contact point 2a, forming a seal that withstands pressures greater than those that the O-Ring could sustain, and forming a seal that prevents flow of fluid with increasing efficiency as pressure increases.

Figure 3:
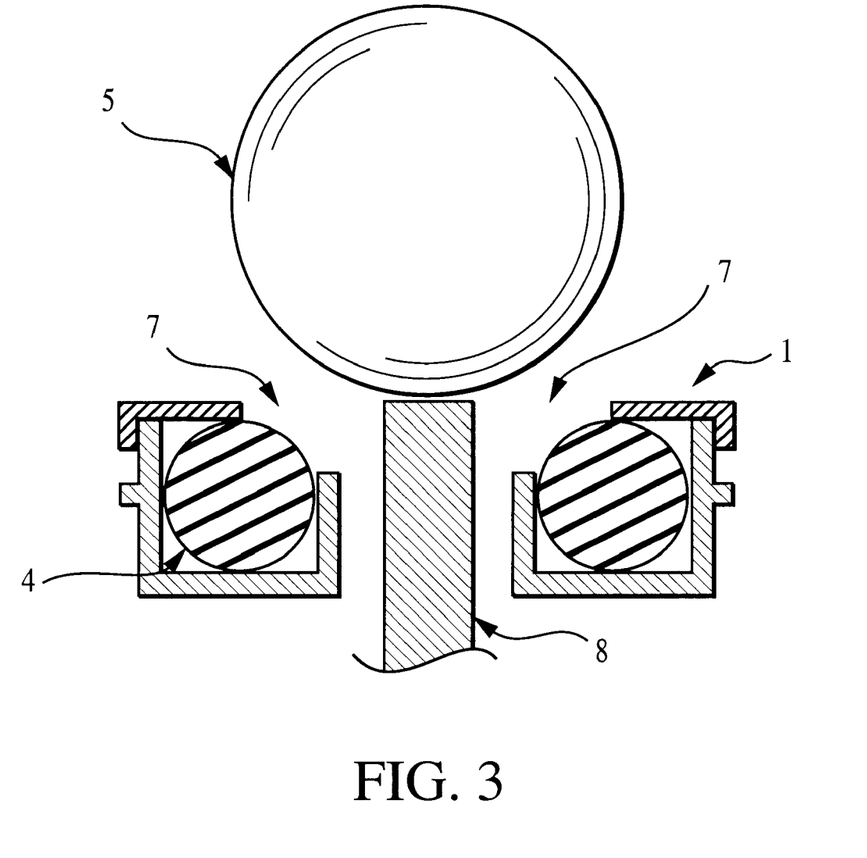
FIG. 3 shows a cross section of the seat of the valve in the open position.

In the preferred embodiment as shown in FIG. 3, a cross section of the seat 1 of the valve is shown in the open position. The sphere 5 is mechanically positioned by a control lever 8 so as to permit the flow of liquid through the seat 1 between the sphere 5 and the O ring 4, and between the sphere 5 and the circular opening 7, to be discharged through the valve.

Figure 4:
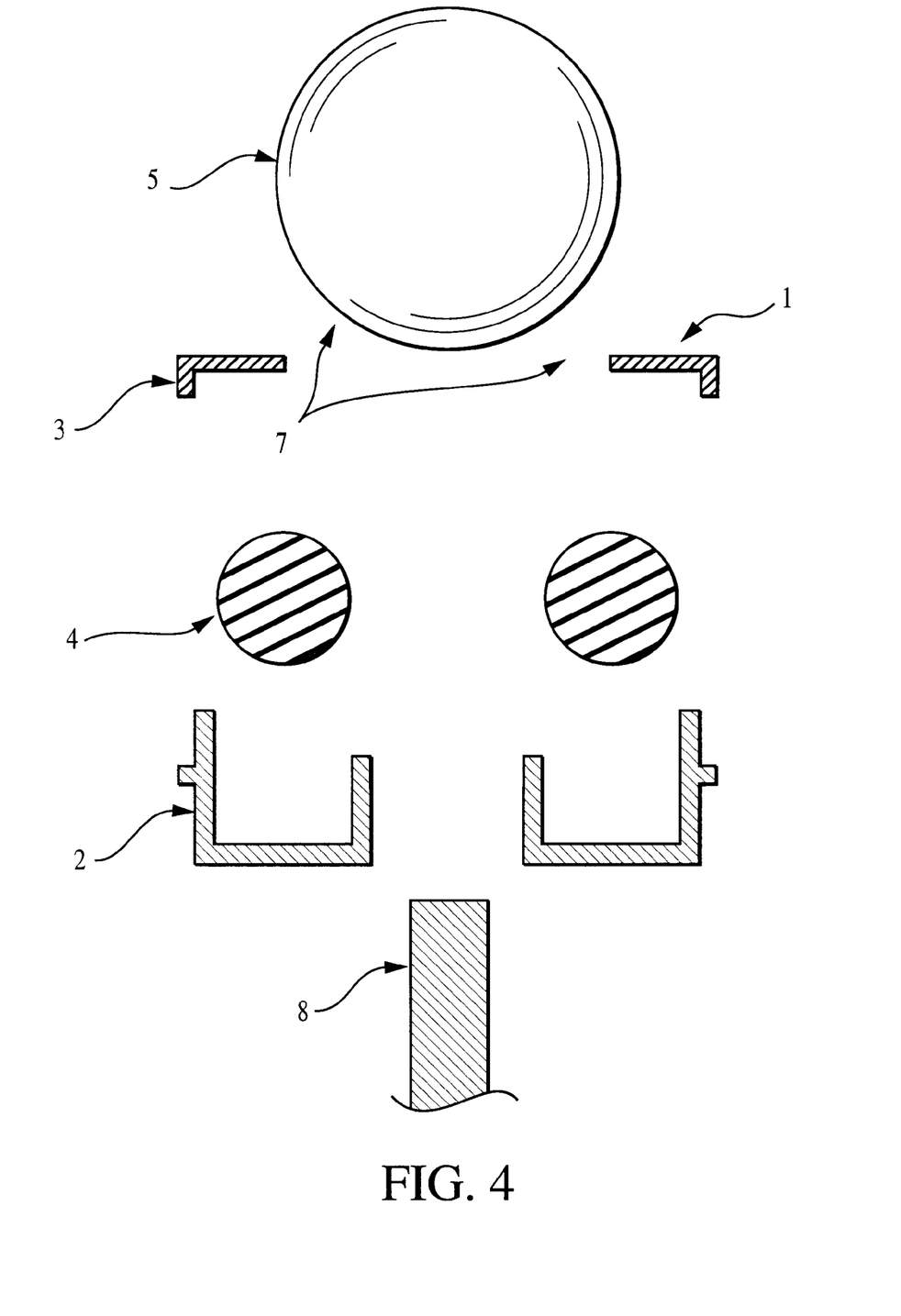
FIG. 4 shows an explosion view of the components that make up the valve seat.

In the preferred embodiment as shown in FIG. 4, an explosion of the components that make up the seat 1 of the valve is shown. The sphere 5 is the mechanism which prohibits the flow of liquid through the valve. The upper base part 3 has a circular opening 7 that is larger than the diameter of the sphere 5. The lower base part 2 mates with the upper base part 3, and positions the O ring 4, whose inside diameter is smaller than the diameter of the sphere. The control lever 8 is shown.

Figure 5:
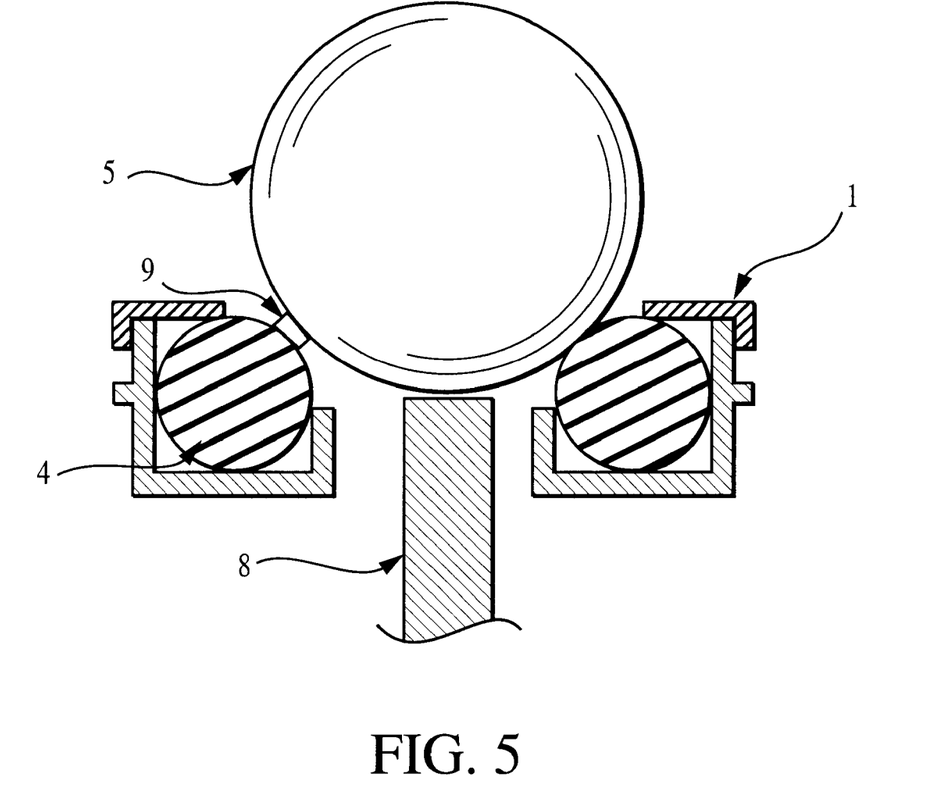
FIG. 5 shows a cross section of the seat of the valve with a grain of sand trapped in the O-Ring.

In the preferred embodiment as shown in FIG. 5, a cross section of the seat 1 is shown with a small grain of sand 9 or other similar contaminant lodged between the O-Ring 4 and the sphere 5. Such a contaminant 9 will lodge between the O-Ring 4 and the sphere 5 during the duration of time when the valve is progressively closing off the flow of the controlled fluid, due to the control lever 8 moving in a downward direction, and when the valve begins to open from this position, the flow of fluid will wash the contaminant 9 from the O-Ring 4, discharging it with the fluid being discharged through the valve. Because the O-Ring 4 lies flat in a plane that is perpendicular to the forces of gravity, any such contaminant 9 lodged in the O-Ring 4 will position itself in a random fashion, thereby avoiding any single place where such contaminants are likely to press into the O-Ring 4. The occurrence of such contaminants 9 is in general small, and the random positioning of such a contaminant 9 around the O-Ring 4 reduces the likelihood of failure due to repeated occurrences in one location.

Figure 6:
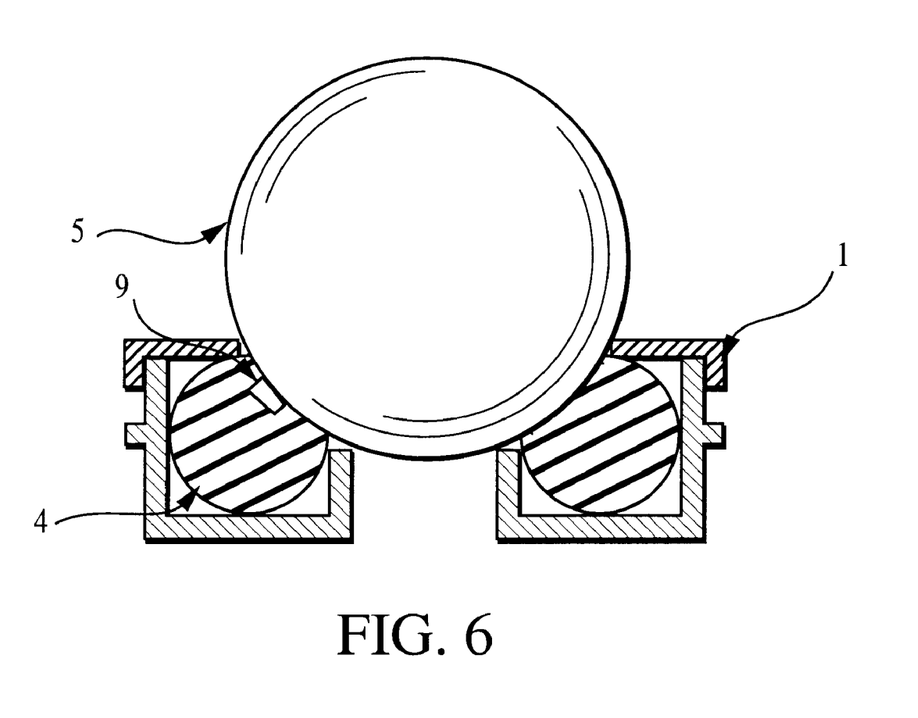
FIG. 6 shows a cross section of the seat of the valve with a grain of sand trapped in the O-Ring, with the valve under pressure and in a closed position.

In the preferred embodiment as shown in FIG. 6, a cross section of the seat 1 is shown with a small grain of sand 9 or other similar contaminant lodged between the O-Ring 4 and the sphere 5. This figure shows the valve under pressure, so that the sphere 5 has formed a seal with the O-Ring 4, pressing the contaminant 9 temporarily into the O-Ring 4.

Figure 7:
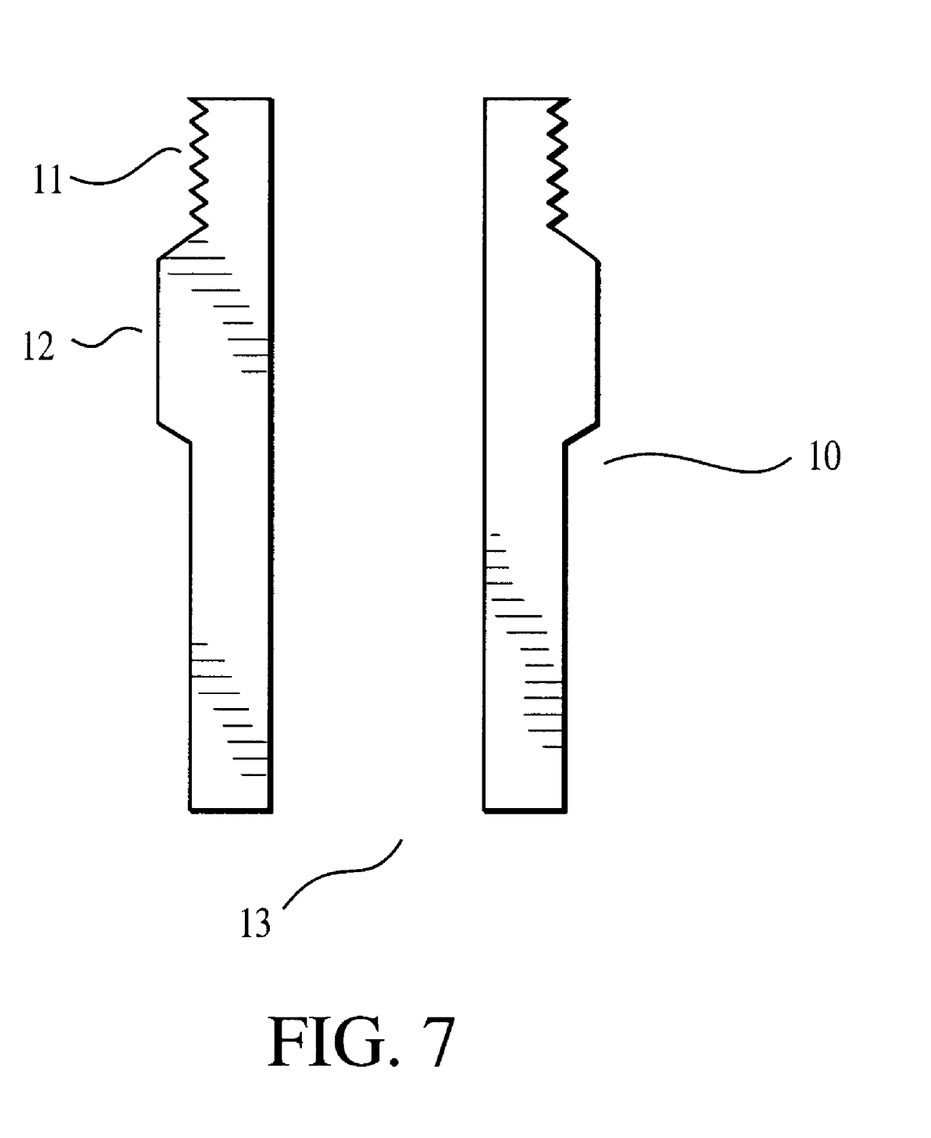
FIG. 7 shows a cross section of the housing.

In the preferred embodiment as shown in FIG. 7, the housing for the invention 10 consists of a cylinder constructed of plastic, threaded on one end 11, with a hexagonal shaped middle section 12, suitable for placing a wrench in order to tighten the threads into a suitable threaded pipe or pipe connector. The opposite end of the housing is unthreaded, and has a discharge orifice 13 through which a flow is permitted when the valve is operating in the "open" position.

Figure 8:
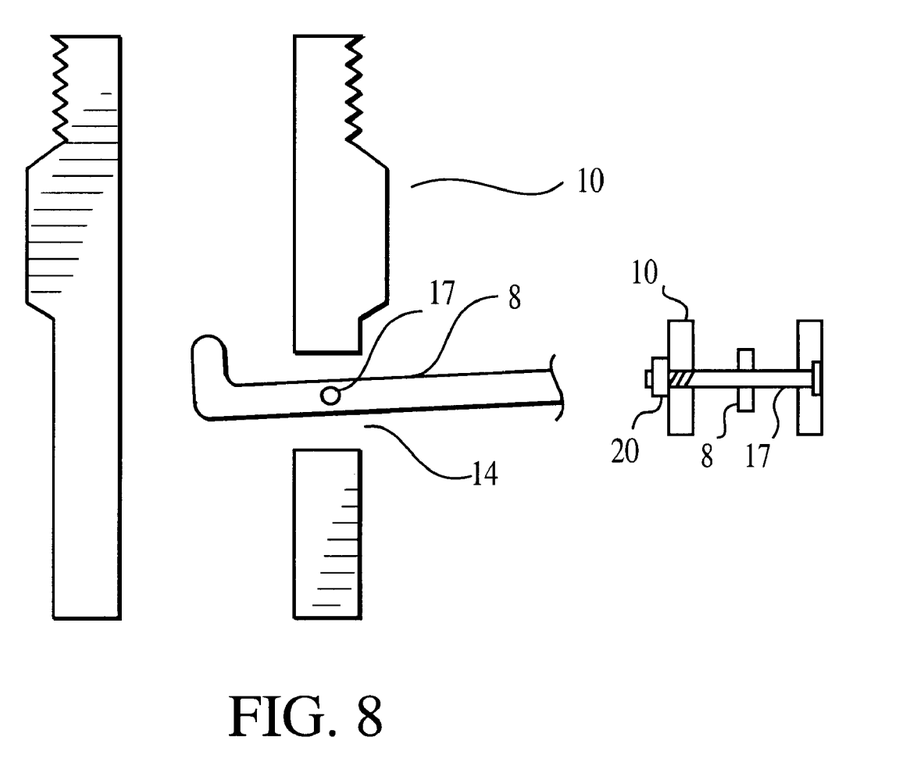
FIG. 8 shows a cutaway view of the valve, showing the operation of the lever which opens and closes the valve.

As shown in FIG. 8, the housing 10 contains a slot 14 through which a lever 8 may move in a direction constrained and guided by the slot 14. The lever 8 extends through the slot 14 to a point in the middle of the cylinder 10. The lever 8 has a hole to accept a pin 17 that creates a fulcrum for the operation of the lever. The pin 17 takes the form of a bolt, and the head of the bold is recessed into a hexagonal shaped recess in the housing 10 to prevent the pin from rotating within the cavity. The opposite end of the bolt is threaded to accept a self locking nut 20 or other connector designed to secure the end of the pin, and to prevent any inadvertent removal of the pin.

Figure 9:
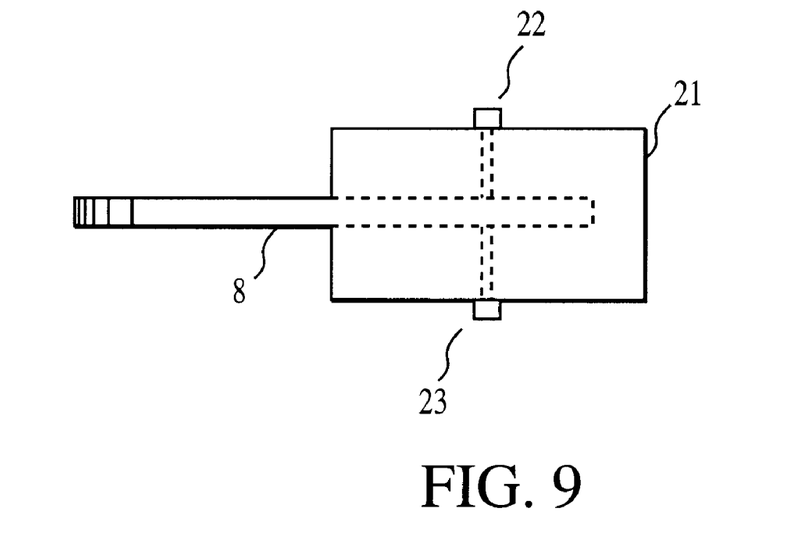
FIG. 9 shows a top view of the float and how it is attached to the operating lever of the invention.

As shown in FIG. 9, a top view of the float as it is assembled to the lever that operates the valve, the lever 8 has attached to it a float 21, by means of a float attaching bolt 22 which extends through the float 21, then the lever 8, and then through the opposite side of the float 21, secured by a nut 23.

Figure 10:
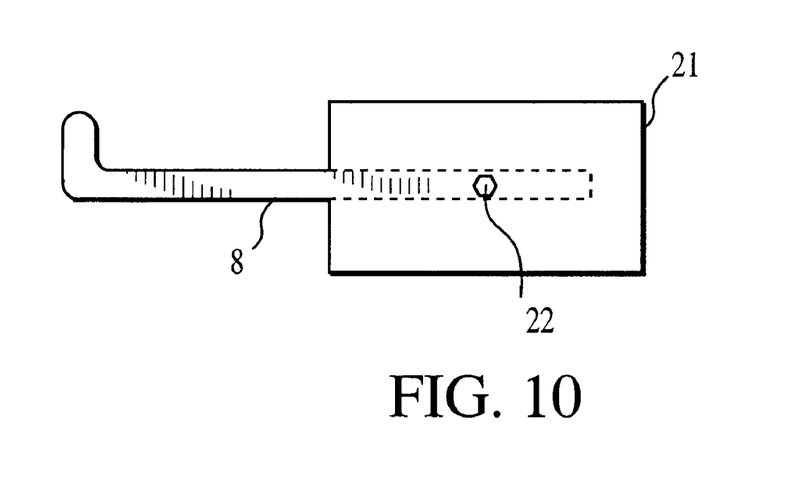
FIG. 10 shows a side view of the float and how it is attached to the operating lever of the invention.

FIG. 10 shows a side view of the lever 8, the float 21, and the float attaching bolt 22.

Figure 11:
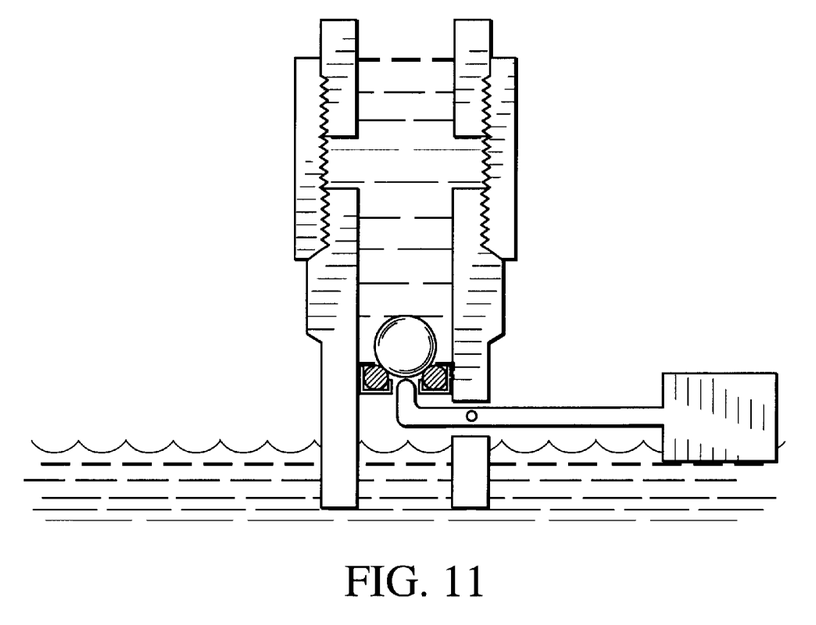
FIG. 11 shows a cutaway view of the invention as it would be attached to a water supply, with the valve in a closed position.

FIG. 11 shows the housing 10 attached to a pipe 24 by means of a standard pipe female coupling 25 which supplies the liquid to be controlled, under pressure, as in a commercial water supply. Shown in a cutaway view, when the lever 8 becomes perpendicular to the cylindrical housing 1, the end of the lever extending into the housing 10 through the slot 14 permits a sphere 5 to rest by force of gravity and by the force of the liquid under any pressure to seat itself against the seat 1 constructed so as to create a tight seal when the sphere comes to rest upon it. In the operating position, the valve will create a tight seal by virtue of the forces of gravity alone. The valve has been demonstrated by placing a single drop of water into a dry valve, which is then placed on a piece of paper. The valve seals tight, even with a pressure that can be characterized as minimal or zero pressure. In this closed position, a higher water pressure will press the sphere more tightly against the seat, creating a tighter fit and a more secure closed position.

Figure 12:
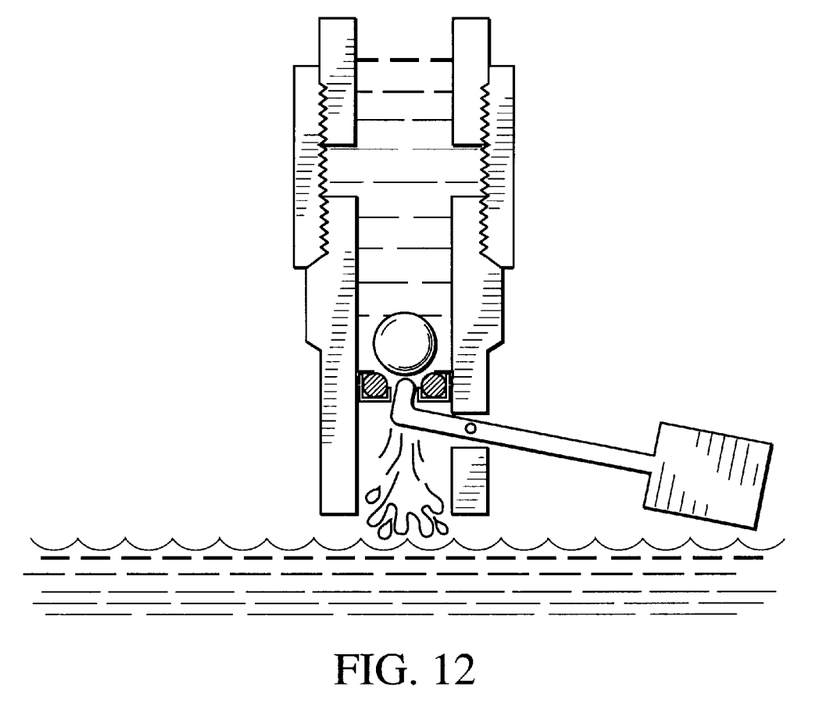
FIG. 12 shows a cutaway view of the invention as it would be attached to a water supply, with the valve in a open position.

When the liquid supporting the float is rapidly removed from the container, as in the flushing of a toilet, or when the level declines slowly, as in the evaporation of water from a tank, the float falls by force of gravity to a position shown in FIG. 12. The lever 8 makes contact with the sphere 5, and the moment of force created by the unsupported weight of the float 21 overcomes the pressure placed on the sphere 5 by the pressure from the water system. The falling of the lever 8 dislodges the sphere 5, forcing it to move away from the seat 1, and permitting the water under pressure to flow through the orifice 13 and empty into the container. When the fluid level rises to a level sufficient to cause the float 21 to rise, and the lever to become again perpendicular to the cylindrical housing, the sphere will once again settle in to the seat, placing the valve in the "off" position again causing the flow of fluid through the valve to once again cease.

When the liquid supporting the float is slowly removed from the container, as might be caused by the evaporation of water in an outdoor watering container, the float will begin to be removed from the supporting water, held up by the pressure of the water pressing on the sphere against the seat, and the sphere contacting the lever. When the moment of force caused by the weight of the float which has been held above the water exceeds the water pressure holding the sphere against the seat, the lever will slightly dislodge the sphere, permitting a small flow of liquid to pass through the valve, until such time as the liquid once again supports the float, and the sphere once again settles in to the seat, once again closing the valve.

Figure 13:
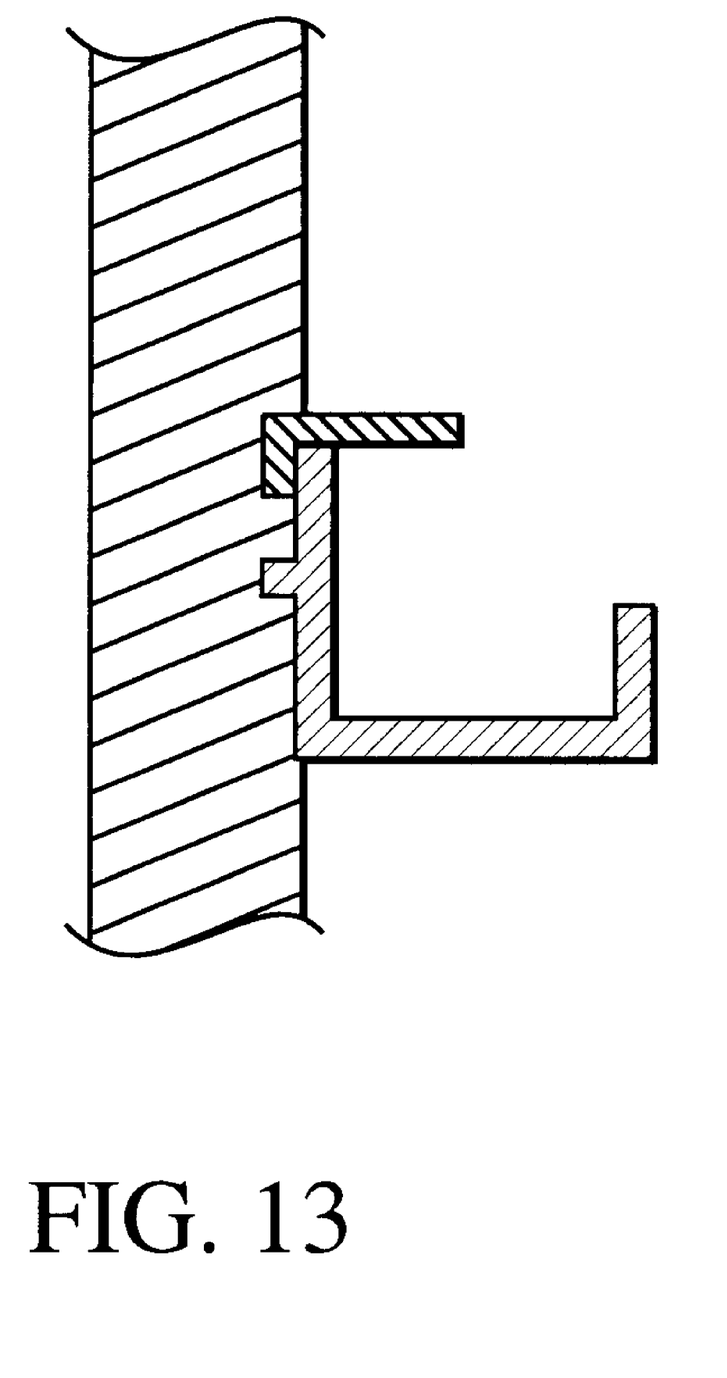
FIG. 13 shows a cross section of the housing of the invention, with a detail of how the seat of the valve is molded so as to incorporate the valve seat into the housing.

The incorporation of the seat into the molded plastic body produces a seat that does not leak around the edges of the seat, owing to the plastic that is molded around the seat. FIG. 13 shows a cross section of the left side of the housing 10, including the manner in which the housing is molded to surround and make a tight mechanical connection with the internal seat 1.

Figure 14:
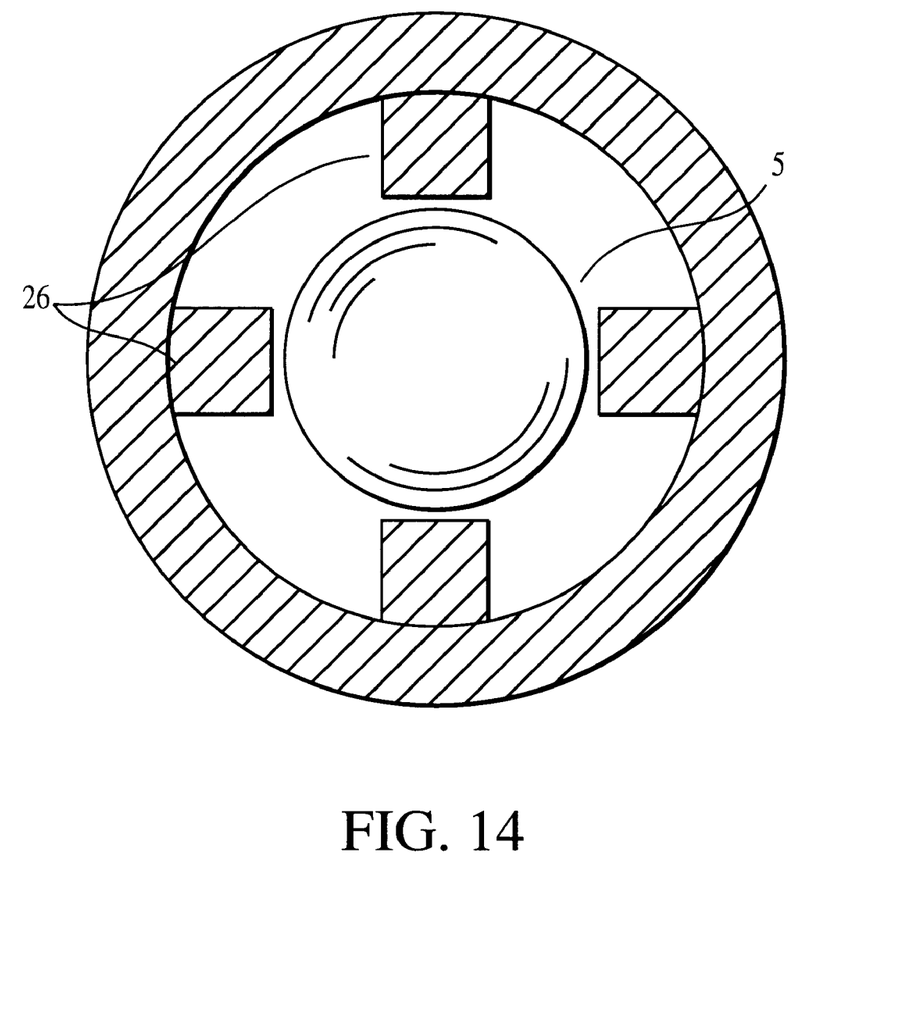
FIG. 14 shows a horizontal cross section of the invention, with a detail of how the fins guide the sphere within the valve.

FIG. 14 shows the horizontal cross section of the internal cylinder of the valve, above the valve seat 1. As is shown, the cylinder has a series of fins running the length of the cylinder which guide the sphere to the center of the cylinder, guiding the sphere 5 to the center of the seat. These fins serve a dual purpose of providing a ledge upon which a screen filter may be placed, so as to prevent large impurities from entering the valve.

Figure 15:
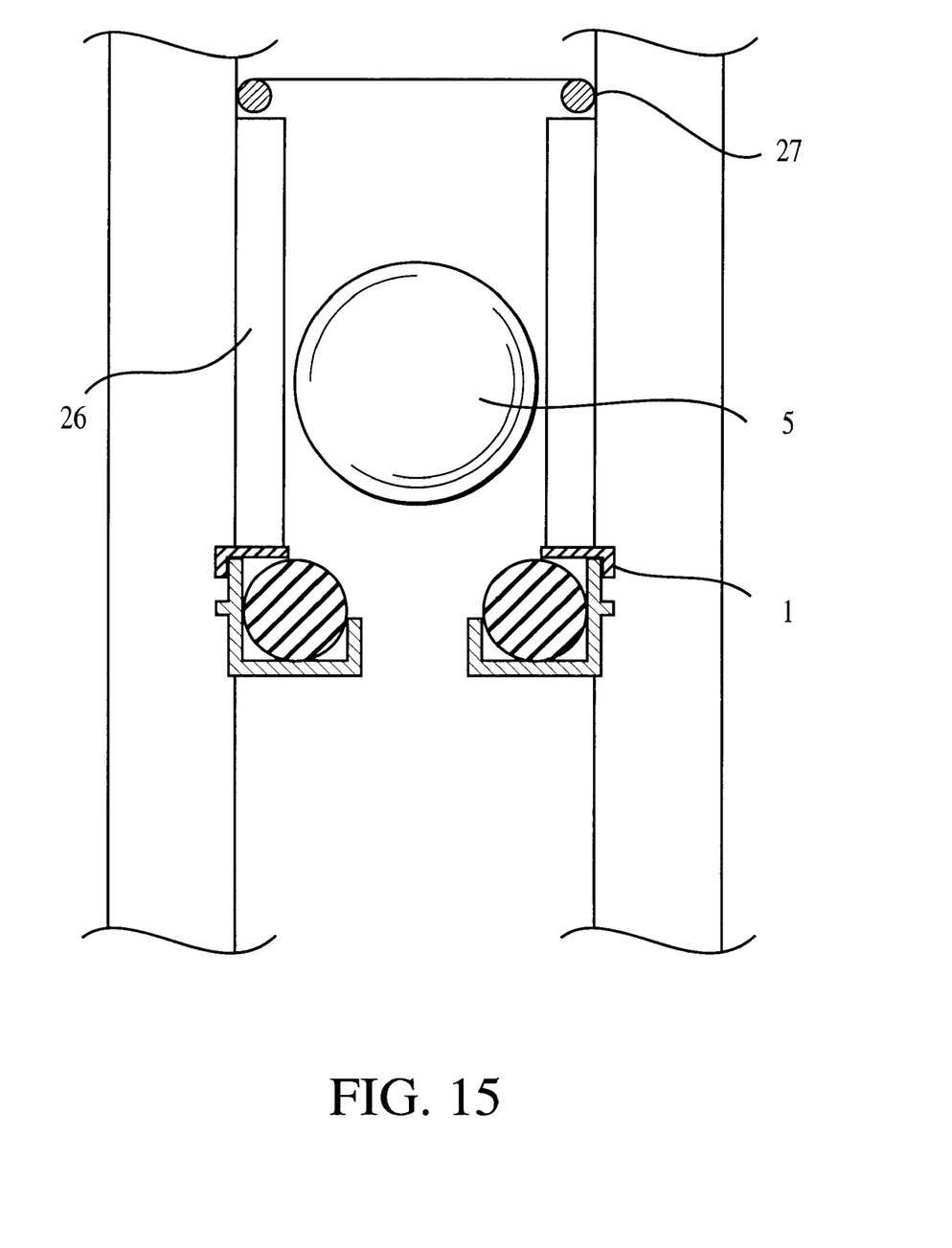
FIG. 15 shows a cross section of part of the housing of the invention, showing how the screen assembly fits atop the fins.

FIG. 15 shows a cross section of the cylindrical housing 1, from the seat 1 to the screen 27. The fins 26 are shown on each side of the cylindrical housing so as to guide the sphere 5. The screen 27 serves the dual purpose of preventing impurities from flowing into the valve seat 1, and serves to inhibit the sphere's upward movement, preventing the sphere from being drawn into the supply of liquid to the valve.

Figure 16:
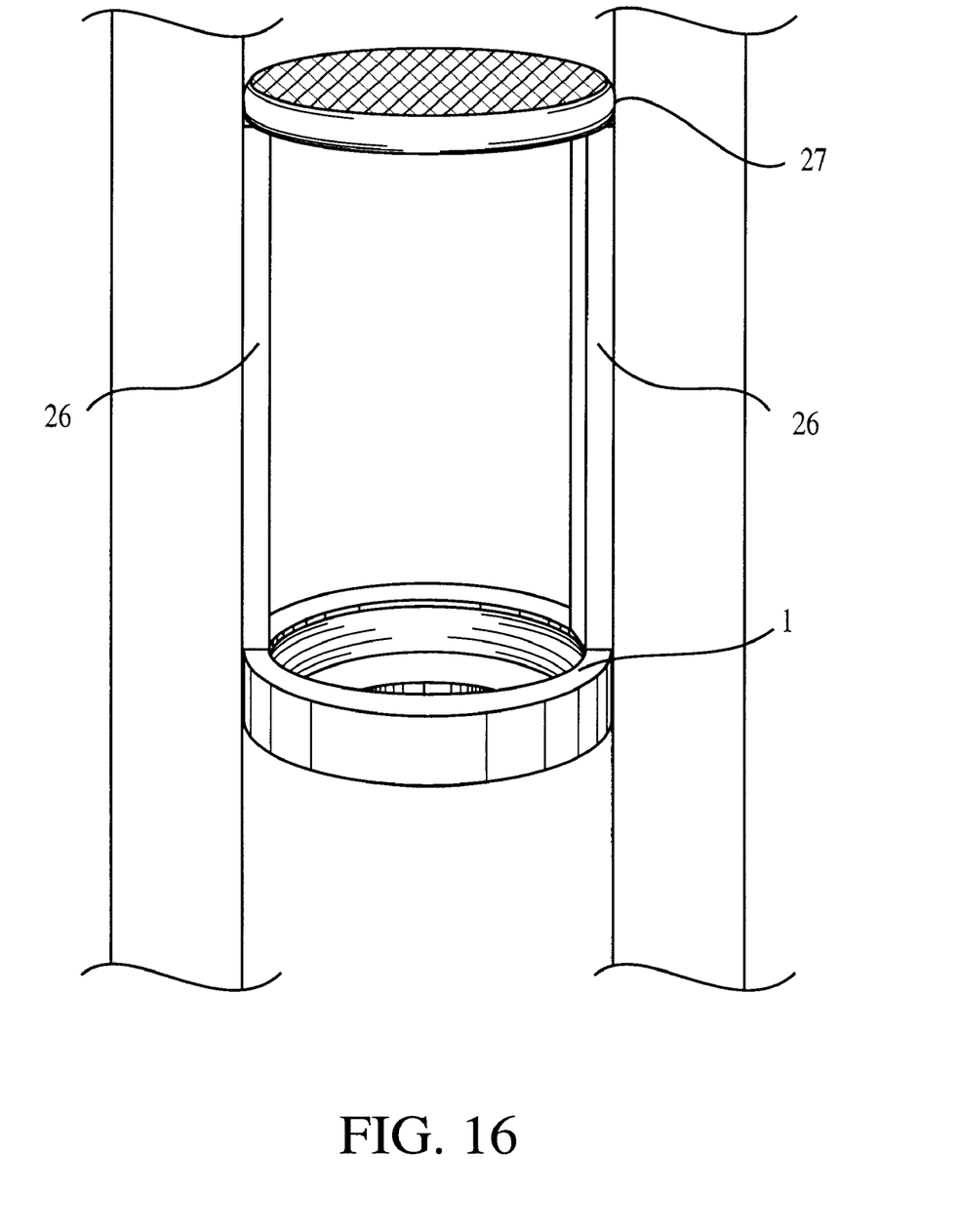
FIG. 16 shows a perspective view of a cutaway of the invention, showing the valve mechanism in detail. For clarity, the sphere is not shown.

FIG. 16 shows the screen filter 27 in place atop the fins 26. The valve seat 1 is shown at the lower end of the invention.

Alternative embodiments of the invention are made of stainless steel, so as to make it possible to disassemble and sterilize the valve, and so as to be acceptable to control food materials, such as milk or honey. In the case of a stainless steel housing, the valve seat is pressed into place and soldered or welded in place, as opposed to being molded in place.

Another embodiment of the invention utilizes a ceramic nonporous material for the valve seat 1 components and the sphere 5, and provides the ability to control corrosive materials, such as strong acids or strong bases, or any liquid which is corrosive to stainless steel. The valve float arm and attaching pins are made of a material not subjected to the corrosive effects of an acidic or basic liquid, or from the fumes of such a liquid.

BRIEF DESCRIPTION OF THE DRAWINGS

The following explains the model in more detail through the attached sketches, as follows.

What is claimed is:

1. A valve consisting of:
   a) a hollow cylindrical housing with
      i) a threaded end, with male threads, suitable for attaching the valve to a pipe or pipe coupling, from which a liquid to be controlled is supplied to said valve, so as to fill a reservoir to a predetermined level,
      ii) a middle section with a series of at least four flat edges arranged about the outer circumference of said housing, each flat edge consisting of a rectangular flat surface that is parallel to a complimentary flat surface on the opposite side of the cylinder, and,
      iii) an unthreaded end with an orifice through which a gas or liquid may flow when the valve operates in an "open" position;
   b) said cylindrical housing containing an internal cylindrical seat machined on one end to accept a sphere;
   c) said cylindrical housing consisting of a moldable material and being molded so as to incorporate said internal cylindrical seat by means of molding the material to incorporate said internal cylindrical seat into said cylindrical housing;
   d) said internal cylindrical seat consisting of a base, a lid, and an O-Ring, said O-Ring being disposed within a cavity defined by said lid and said base;
   e) said base being made of stainless steel, and having a cylindrical shape with a cavity to accept said O-Ring;
   f) said lid being made of stainless steel, and made to mechanically couple with said base, so as to position said O-Ring in a manner that facilitates a seal between said O-Ring and said sphere, when said cylindrical housing is in a position whereby the threads are facing up;
   g) said sphere being made of stainless steel, and having a diameter that is larger than the circular opening in said base, and smaller than the cylindrical opening formed by the inside surfaces of said cylindrical housing;
   h) said sphere being placed so that when the sphere makes contact with the seat, pressed there by the pressure of said liquid or gas, a seal is formed that prevents the passage of said liquid or said gas past said seal;
   i) said cylindrical housing having a plurality of fins located on the inside wall of the cylindrical opening so as to form a guide for the sphere to move away from the O-Ring, or to be positioned squarely upon the O-Ring to provide an effective seal;
   j) a screen attached to a circular frame, said circular frame being of a diameter so as to fit snugly within the cylinder at a point just above the fins within the cylinder, with a mesh fine enough to prevent contaminants from entering the valve mechanism, and serving to prevent the sphere from being extracted from the valve under a negative pressure, said fins being disposed between said seat and said screen;
   k) said cylindrical housing containing a pin that passes through the outer wall of the cylinder in the unthreaded end, into the cavity of the hollow cylinder, and out through the outer wall of the cylinder in the unthreaded end;
   l) said pin being positioned so as to create the fulcrum of a lever which passes from a point inside the cylindrical housing, through a slot, to the outside of the cylindrical housing;
   m) said lever having a float attached to it at the extremity farthest from the cylindrical housing;
   n) said float being made of such a material that would allow the float to be buoyant so that it can move as a function of said liquid or gas level within said reservoir, said float being attached to said lever at a distance from said pin so that the moment of force, which is a function of the change in the level of said liquid or said gas within said reservoir, is sufficient to overcome said pressure supplied by the input of said gas or liquid that maintains the sphere in sealing engagement with said seal, thereby allowing said sphere to be moved away from said seal to permit said liquid or gas to fill said reservoir to said predetermined level and moving said sphere back into sealing engagement with said seal.

2. A valve as in claim 1, wherein the base, lid, and sphere are made of a nonporous ceramic material.

3. A valve as in claim 1, wherein the cylindrical housing is made of stainless steel.

4. A valve as in claim 1, wherein the cylindrical housing is made of stainless steel, and wherein the base, lid, and sphere are made of a nonporous ceramic material.

* * * * *